Figure 1:
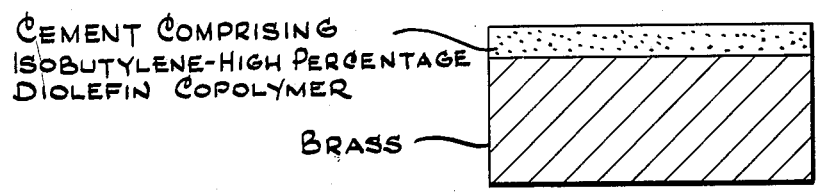

Feb. 26, 1952     F. P. BALDWIN     2,587,430

BONDING OF ISOBUTYLENE-ISOPRENE COPOLYMER TO BRASS

Filed Aug. 3, 1946

Francis P. Baldwin Inventor
By W. H. Smyers Attorney

Patented Feb. 26, 1952

2,587,430

UNITED STATES PATENT OFFICE 2,587,430

BONDING OF ISOBUTYLENE-ISOPRENE COPOLYMER TO BRASS

Francis P. Baldwin, Linden, N. J., assignor to Standard Oil Development Company, a corporation of Delaware Application August 3, 1946, Serial No. 688,348

7 Claims. (Cl. 117—132)

This invention relates to composite structures, relates particularly to means for adhering elastic bodies to metal or other structures, and relates especially to a polymer characterized by high adhesivity to brass.

It has been found possible to produce a very high-grade substitute for rubber by the polymerization of isobutylene with a diolefin or multiolefin at low temperatures. This material, however, has been found to be relatively only slightly adhesive to metals such as brass.

According to the present invention, the particular type of low temperature polymer of isobutylene with isoprene prepared from a mixture of isobutylene with a minor but relatively high proportion of isoprene in the presence of a moderately high proportion of methyl chloride by the application of a dissolved Friedel-Crafts catalyst; which polymer shows a very strong adhesivity to brass.

Thus the invention produces a structure consisting of a portion formed from brass to which there is strongly adherent a copolymer of isobutylene with a relatively high proportion of a multi-olefin such as isoprene prepared at a temperature within the range between —40 and —103° C. Other objects and details of the invention will be apparent from the following description:

The polymer member of the structure of the invention preferably consists of from 90 to 98% isobutylene having a purity of approximately 98% with from 2 to 10% of isoprene having a purity of approximately 96%. Isoprene is the most convenient multi-olefin for this use because of its ready commercial availability and the large amount of work which has been done on the purification and utilization of it. However, other conjugated diolefins of 4 to 6 carbon atoms, particularly piperylene and dimethyl butadiene are substantially equally good and are nearly as satisfactory. Butadiene as such, is equally good but considerably larger quantities are required in the reaction mixture. Other multi-olefins such as allo-ocymene, myrcene, dimethallyl; and in fact substantially all of the multi-olefins having two or more units of unsaturation, that is carbon to carbon double linkage, having up to about 14 carbon atoms per molecule are more or less useful under special circumstances.

The olefinic materials are mixed in the above-indicated proportions and are then mixed with from an equal volume to two volumes of methyl chloride; and polymerized at a temperature within the range between —40° C. and —103° C.

For the polymerization procedure, the mixture of isobutylene, isoprene and methyl chloride is placed in a jacketed reactor equipped with a powerful stirring means, preferably a propeller type stirrer and the low temperature is maintained by an appropriate refrigerant in the jacket.

For the refrigerant, any convenient low-boiling liquid may be used in the jacket, including such substances as liquid propane, liquid sulfur dioxide, liquid carbon dioxide, liquid ethane, liquid ethylene, liquid low-boiling fluorine substituted alkyls, and the like. The jacket may be held under pressure or suction to produce the desired temperature according to the particular refrigerant chosen. The preferred temperatures range from about —40° C., or better, —78° C. down to —103° C., since the reaction proceeds more satisfactorily at these lower temperatures.

The polymerization is then conducted by adding to the cold olefinic mixture a Friedel-Crafts catalyst, preferably in solution in a low-freezing, non-complex-forming solvent. For the catalyst, aluminum chloride is the preferred substance, but any of the Friedel-Crafts active metal halides disclosed by N. O. Calloway in his article on "The Friedel-Crafts Synthesis" printed in the issue of "Chemical Reviews" published for the American Chemical Society at Baltimore in 1935, in Volume XVII, No. 3, the article beginning on page 327, the list being particularly well shown on page 375, may be used; and also such substances as the double halides of these metals such as the chloro bromides, especially of aluminum and titanium. Boron trifluoride, especially in relatively highly concentrated solution is also an effective catalyst. In addition, various of the metal halo-alkoxides such as aluminum chloroeth-oxide are satisfactory.

The solvent to be "low freezing" must have a freezing point below 0° C. To be "non-complex forming" the characteristics of the solvent must be such that it does not separate from the solution upon evaporation of the solvent a compound containing portions of both the solvent and Friedel-Crafts catalyst, or, upon addition of the solvent in vapor form at constant temperature to the catalyst, will lead to a substantially continuous change in the composition of the solution and a continuous change in partial pressure of the solvent and methyl chloride and carbon disulfide for any of the active metal halo compounds. With various of the compounds, such hydrocarbons as liquid ethane, liquid propane, liquid butane, pentane, hexane, light naphtha and the like are also satisfactory solvents.

It may be noted that while ethyl and methyl chloride are the preferred solvents, any alkyl compound having one or more halogen substituents and a freezing point below 0° C. is usable as a catalyst solvent and when the words "alkyl halide" are used in the claims they are understood to mean both the mono-halides and polyhalides without regard to the halogens chosen and without regard to the number of halogen substituents.

It is usually desirable also to dilute the reaction mixture with an appropriate diluent. For the diluent such substances as ethyl or methyl chloride or methylene dichloride or chloroform or ethylene dichloride or ethyl trichloride or other fluorine, chlorine, bromine or iodine substituted alkanes may be used. Also various hydrocarbons as well as carbon disulfide and a variety of other sulfur compounds may be used. It is usually desirable to have from ½ volume to 6 or 8 volumes of diluent per volume of mixed olefins depending upon the particular multi olefin chosen, and the polymerization conditions.

The reaction is preferably conducted by the addition of the catalyst either in the form of a fine high-pressure jet into the body of strongly stirred olefinic material, or in the form of a fine spray onto the surface of the strongly stirred olefinic mixture, depending upon the particular form of reactor chosen.

The reaction proceeds promptly to yield the desired polymer, which precipitates in the form of a white solid from the solution. The polymer is conveniently recovered in any one of a variety of different procedures. It may be simply strained out from the reaction liquid, but since the rate of build-up of impurities in the reaction liquid is relatively rapid, the residual reaction liquid can seldom be used for another polymerization without purification. Accordingly, it is usually preferable to discharge the entire reaction mixture into warm water or warm naphtha, or the like, to volatilize the residual unsaturates and the methyl chloride and the catalyst solvent and to leave the polymer in the form of a more or less fine grained slurry in the warm water. It may be noted that satisfactory quality of polymer usually requires that not more than 40 to 65% of the unsaturates present in the original mixture be copolymerized, and accordingly, when the reaction is terminated, there is present not only the methyl chloride diluent but also substantial quantities of unsaturates which are volatilized out and can be fractionated, purified and re-used after a purification step.

The resulting polymer preferably has a Staudinger molecular weight number of from 30,000 to about 80,000, the most useful molecular weight range being between about 30,000 and about 40,000. The polymer preferably has an unsaturation corresponding to 2 to 8% of combined diolefin as indicated by the iodine number obtained by the addition of iodine chloride, that is, ratio of isobutylene molecules to isoprene molecules within the range between 2% and 9 or 10%, that is, the copolymer may contain from 98% copolymerized isobutylene molecules with 2% of copolymerized isoprene or other multi olefin molecules down to 90% of copolymerized isobutylene with 10% of copolymerized multi olefin molecules.

The material is also reactive with sulfur, especially in the presence of a thiuram type accelerator, in a typical curing reaction and is similarly reactive with such substances as para quinone dioxime and its analogs and homologs; the dioximes broadly and also with the dinitroso compounds broadly in similar curing reactions which develop in the polymer a substantial tensile strength, and destroy the plasticity and cold flow properties which are characteristics of the polymer as produced.

This polymer, in addition to a preferred amount of 2 to 3% of sulfur, can be compounded with a variety of additional substances such as stearic acid, zinc oxide, carbon black, and the like, and may be used either in the solid form or in solution.

The compounded polymer is applied to a brass article, either from solution in the form of a cement, or as a solid lamina and when cured against the brass is strongly adhesive thereto and can be removed only with the greatest difficulty, the bond to brass often being stronger than the body of material.

The resulting composite article of brass and strongly adherent cured polymer is very useful for a wide variety of structural purposes. In the making of tire casings, the brass plated wire used for base bands can be caused to adhere very strongly to the polymer, making an exceedingly stout tire casing. Similarly, for elastic supports, the polymer may be cured to or between brass structures which are fastened to the foundation and the article to be flexibly mounted and the relatively high strength both of the cured polymer and of the junction to the brass results in a very satisfactory structure.

Similarly, the procedure is highly satisfactory and efficient for the attaching of polymer linings to tanks, tubes, pipe fittings, and the like, where it is essential that a layer of the polymer be firmly held in place. There are many uses to which natural rubber has been put in which the natural rubber is made adherent to a metal structure by the use of a tie ply of modified rubber, such as cyclicized rubber or the like. The structure of the present invention is useful for practically all of these purposes by the utilization of a tie ply of the present polymer, and if desired a foundation of brass plate on the structure to yield a covering of material which is much more resistant to acid, alkali, or other chemical substance than is the case with caoutchouc (natural rubber).

*Example 1*

A mixture was prepared consisting of 95 parts by weight of liquid isobutylene and 5 parts by weight of liquid isoprene, having respectively 98% and 96% purity and the mixture was diluted with two volumes of methyl chloride. To this mixture there was then added a solution of aluminum chloride in methyl chloride of approximately 0.75% concentration, a weight of aluminum chloride equal to 1.5% of the mixed olefins being added for the polymerization step. The polymerization was conducted at a temperature of approximately −100° C. as above outlined, to yield the desired polymer.

The resulting polymer showed a Staudinger molecular weight number of approximately 35,000; and an unsaturation value of 2.2%, which indicates that 2.2% of the isoprene monomer were combined with 97.8% of isobutylene in the polymer produced.

This polymer was then compounded according to the following recipe:

| | Parts by weight |
|---|---|
| Polymer | 100.0 |
| Zinc oxide | 5.0 |
| Stearic acid | 1.5 |
| Sulfur | 3.0 |
| "Gastex," semi-reinforcing furnace black | 75.0 |
| Mercapto benzo thiazol | 1.0 |
| Diphenyl guanidine | 0.25 |

The compound was prepared on the open roll mill, the polymer being thrown on the mill first and milled until plastic, the other substances then being added and milled until they were thoroughly incorporated. Portions of this compound were then dissolved in 54° naphtha to yield an approximately 20% solution.

Portions of the solid compound, cured in the mold, showed on test the following inspection record:

| | |
|---|---|
| Tensile strength | 1250#/in.² |
| Modulus @ 300% elongation | 740#/in.² |
| Ultimate elongation | 520% |

Simultaneously a brass structure prepared from a high copper brass, that is 70% copper and 30% zinc, was sand-blasted to clean the surface and rid it of grease and oxide, and the structure was then coated on one surface with cement, prepared as above described. A first coat was applied and allowed to dry for 30 minutes. Then a second coat was applied and allowed to dry for another 30 minutes. Then on top of the second coat a lamina or ply of the solid compound as first prepared was applied and rolled down with a "stitcher." The material was then placed in the press and cured for 60 minutes at 307° C. A strip one inch wide was then outlined by knife cuts and pulled away from the brass at the rate of two inches per minute in a Scott tensile strength tester. The pull required was found to be 21 pounds. (For comparison purposes, a sample of standard polymer prepared from a mixture of 98.55 parts of isobutylene with 1.45 parts of isoprene compounded by a similar recipe and cured against cleaned brass, as above described, showed an adhesive strength of only 1 to 3 pounds per inch under the same test.) It will be obvious that this change in polymer yields an adhesion which is different in order of magnitude.

In the accompanying drawing, Figure 1 shows a cross section of a laminated structure comprising a brass structure to which is bonded a cement coating which comprises an isobutylene-isoprene copolymer. The copolymer is prepared in accordance with the process of the present invention by copolymerizing a mixture of 95% of isobutylene and 5% of isoprene.

*Example 2*

A similar brass structure was cleaned and given two coats of the cement described in Example 1 and then when the cement had dried, a layer of polymer prepared with 1.45 parts of isoprene in the polymer, compounded according to the following recipe was applied in laminar form on the surface of the cement, "stitched" down with the roll, as above described, and then cured in the press:

| | Parts by weight |
|---|---|
| Polymer | 100.0 |
| Zinc oxide | 5.0 |
| Stearic acid | 3.0 |
| Sulfur | 2.0 |
| Carbon black | 50.0 |
| Tetramethyl thiuram disulfide | 1.0 |
| Mercapto benzo thiazole | 0.5 |

This polymer recipe produces in the polymer a tensile strength of approximately 2200 pounds per square inch. A ply of this polymer when cured with the double layer of cement underneath, on a brass structure showed an adhesivity of 23 pounds on an inch wide test sample in the Scott tester, as above outlined.

This shows the excellent adhesion of the above described cement both to brass and to other polymers. In each instance, the separation was in the body of the cement lamina, showing that the adhesivity to the brass was superior to the tensile strength of the compound.

Figure 2:
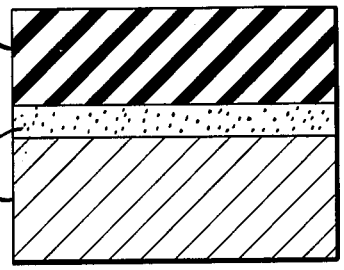

In the accompanying drawing, Figure 2 shows a cross section of a laminated structure which comprises a brass structure to which there is attached a ply of isobutylene-isoprene copolymer, the ply being bonded to the brass by means of a cement of isobutylene-isoprene copolymer. This cement is prepared in accordance with the process of the present invention by copolymerizing a mixture of 95% of isobutylene and 5% of isoprene.

*Example 3*

Another polymer was prepared from a mixture, as above described, utilizing 95 parts of isobutylene with 5 parts of isoprene, but with only one volume of methyl chloride. This polymer showed a Staudinger molecular weight number of 40,000; and an unsaturation value corresponding to 2.6. This material was then compounded as shown in the following recipe:

| | Parts by weight |
|---|---|
| Polymer | 100.0 |
| Zinc oxide | 5.0 |
| Stearic acid | 1.5 |
| Sulfur | 2.5 |
| Carbon black | 50.0 |
| Mercapto benzo thiazole | 1.0 |
| Diphenyl guanidine | 0.2 |

Portions of this compound were cured in the mold and tested, yielding the following inspection record:

| | |
|---|---|
| Tensile | 1880#/in.² |
| Modulus @ 300% | 450#/in.² |
| Ultimate elongation | 790% |

Another portion of the compound was dissolved in 54° naphtha to yield a cement having a concentration of approximately 20%, as in Example 1. This cement was then applied to a clean brass surface, as in Example 1, using two coats with 30 minutes time for each to dry and then the cement was covered by a ply of the same compound. Upon test in the Scott tester, as before outlined, this material showed an adhesivity of 23 pounds per inch.

These examples show the adhesivity of a copolymer of isobutylene and isoprene containing from 2 to 10% isoprene to a brass surface, but the invention is not limited to the copolymer of isobutylene and isoprene, since similar copolymers containing corresponding amounts of other multi olefins are equally useful. That is, a copolymer of isobutylene with butadiene containing from 2 to 10% of copolymerized butadiene shows a similar adhesivity. Likewise, copolymers of isobutylene with piperylene, with dimethyl butadiene, with myrcene, with dimethallyl, with allo-ocymene, and the other above-indicated multi olefins serve more or less nearly as well, provided they contain similar amounts of the multi olefin copolymerized into the polymer molecule. That is, the essence of the invention is the combination of a brass surface with a copolymer of isobutylene and a multi olefin having from 4 to 14 carbon atoms per molecule with from 2% to 10% of the multi olefin copolymerized into the polymer molecule; and polymerizations closely similar to those shown in the example may be had with the other multi olefins with only those changes in the multi olefin content in the polymerization mixture which can be made within the knowledge of those skilled in the art.

It may be noted that the polymer of the present invention shows this strong adhesiveness only to brass, but it is readily transferred to any desired metal merely by covering the desired metal structure with an electroplate coat of brass. A brass plate adheres quite strongly to any of the metals and shows the same high adhesiveness for the polymer which is characteristic of solid brass. By this procedure, the present polymer may be caused to adhere firmly to any object upon which a plating of brass can be applied; this even including glass or other non-metallic substance which may be platinized (as by cathode sputtering) and then brass-plated.

Thus the invention produces a composite article consisting of a brass lamina and a lamina of a special polymer prepared from a mixture of isobutylene and isoprene in the range between 4% and 10% isoprene to which may be attached a wide range of other substances including similar polymers, or by the use of tie plys, any of the rubber-like gums or resins, both natural and synthetic, including caoutchouc, gutta-percha, the simple polymers of butadiene, the copolymers of butadiene and styrene, known as Buna S, the copolymers of butadiene with acrylonitrile; the polymers and copolymers of chloroprene, the various phenol formaldehyde resins and the like.

While there are above disclosed but a limited number of embodiments of the process and product of the invention, it is possible to produce still other embodiments without departing from the inventive concept herein disclosed.

The invention claimed is:

1. A laminar structure comprising a brass surface composed of about 70% copper and about 30% zinc and a lamina adherent thereto comprising a polymer which consists essentially of about 90 to 98% of combined isobutylene and 10 to 2% of combined isoprene, prepared from a mixture of isobutylene and isoprene with the isoprene present in the range from 4% to 10% by a low temperature polymerization reaction, the said lamina containing zinc oxide, stearic acid, carbon black and a curing agent containing sulfur in an amount between 2 and 3% based on the polymer.

2. A laminar structure comprising a brass surface composed of about 70% copper and about 30% zinc and a lamina adherent thereto comprising a solid elastic polymer which consists of about 97.8% of combined isobutylene and 2.2% of combined isoprene prepared from a mixture of 95% liquid isobutylene and 5% liquid isoprene by a low temperature polymerization reaction, the said lamina consisting, in addition to 100 parts of the polymer, of 5 parts of zinc oxide, 1.5 parts of stearic acid, 3 parts sulfur, 75 parts carbon black, 1 part mercaptobenzothiazole and 0.25 part of diphenyl guanidine.

3. A laminar structure comprising a brass surface composed of about 70% copper and about 30% zinc and a lamina adherent thereto comprising a polymer which consists essentially of 90 to 98% of combined isobutylene and 10 to 2% of a combined multiolefin having 4 to 14 carbon atoms per molecule, the said lamina also containing a sulfur-containing curing agent.

4. A laminar structure comprising a brass surface composed of 70% copper and 30% zinc and a lamina adherent thereto comprising a polymer which consists of 90 to 98% of combined isobutylene and 10 to 2% of a conjugated diolefin of 4 to 6 carbon atoms prepared from a mixture of isobutylene and the diolefin by a low temperature polymerization reaction, the said lamina containing zinc oxide, stearic acid, carbon black and a curing agent comprising sulfur and a thiuram type accelerator.

5. A process for adhering an isobutylene containing polymer to brass consisting of 70% copper and 30% zinc, the process comprising the steps of copolymerizing with the isobutylene from 2% to 10% of isoprene to form a copolymer, cleaning a brass surface to remove grease and oxide, applying thereto a solution of said copolymer containing a sulfur curing agent and curing the polymer in contact with the brass.

6. A process for adhering an isobutylene containing polymer to brass consisting of about 70% copper and 30% zinc, the process comprising the steps of copolymerizing with an isobutylene from 2% to 10% of isoprene to form a copolymer, cleaning a brass surface to remove grease and oxide, applying thereto a solution of said copolymer containing stearic acid, zinc oxide, carbon black, sulfur and an accelerator and curing the copolymer in contact with the brass.

7. A laminar structure comprising a high copper brass surface and a lamina adherent thereto comprising a polymer which consists essentially of about 90 to 98% of isobutylene and 10 to 2% of combined isoprene, the said lamina also comprising a sulfur-containing curing agent for the polymer.

FRANCIS P. BALDWIN.

REFERENCES CITED

The following references are of record in the file of this patent:

UNITED STATES PATENTS

| Number | Name | Date |
| --- | --- | --- |
| 2,065,941 | Lane | Dec. 29, 1936 |
| 2,078,917 | Malone | Apr. 27, 1937 |
| 2,144,495 | Humphrey | Jan. 17, 1939 |
| 2,147,620 | Winkelmann | Feb. 14, 1939 |
| 2,291,510 | Thomas | July 28, 1942 |
| 2,311,004 | Thomas et al. | Feb. 16, 1943 |
| 2,311,308 | Thomas et al. | Feb. 16, 1943 |
| 2,320,313 | Thomas et al. | May 25, 1943 |
| 2,356,130 | Thomas et al. | Aug. 22, 1944 |
| 2,422,903 | Huston | June 24, 1947 |
| 2,442,218 | Sparks et al. | May 25, 1948 |

FOREIGN PATENTS

| Number | Country | Date |
| --- | --- | --- |
| 112,875 | Australia | Apr. 24, 1941 |

OTHER REFERENCES

Gurney, "Trans. of Inst. of Rubber Ind." September 1945, pp. 31–40.

Buchan, "Trans. of Inst. of the Rubber Industry," September 1943, pp. 25–37.

Habgood, "Trans. of Inst. of the Rubber Industry," August 1937, pp. 136–159.

Butyl Rubber, "The Services Rubber Investigations," Mfg's Memorandum #M7, 1943.

Thomas, "Ind. and Eng. Chem.," vol. 32, October 1940, pp. 1283–1292.

Haworth, "Ind. and Eng. Chem.," vol. 34, November 1942, pp. 1301–1308.

Buchan, "Rubber to Metal Bonding," Lockwood & Sons, London 1948, pp. 82–91.